US007909692B2

(12) United States Patent
Nguyen et al.

(10) Patent No.: US 7,909,692 B2

(45) Date of Patent: Mar. 22, 2011

(54) APPARATUS FOR PRE-DETERMINED GAME OUTCOMES

(75) Inventors: Binh T. Nguyen, Reno, NV (US); Craig A. Paulsen, Reno, NV (US); Brian Underdahl, VC Highlands, NV (US)

(73) Assignee: IGT, Reno, NV (US)

( * ) Notice: Subject to any disclaimer, the term of this patent is extended or adjusted under 35 U.S.C. 154(b) by 902 days.

(21) Appl. No.: 11/480,189

(22) Filed: Jun. 29, 2006

(65) Prior Publication Data

US 2006/0247064 A1 Nov. 2, 2006

Related U.S. Application Data

(63) Continuation-in-part of application No. 10/937,989, filed on Sep. 10, 2004.

(51) Int. Cl.
*G06F 17/00* (2006.01)

(52) U.S. Cl. .......................................................... 463/22

(58) Field of Classification Search ............... 463/16–25
See application file for complete search history.

(56) References Cited

U.S. PATENT DOCUMENTS 4,157,829 A 6/1979 Goldman et al.
4,332,389 A 6/1982 Lloyd, Jr. et al.
4,335,809 A 6/1982 Wain
4,339,798 A 7/1982 Hedges et al.
4,373,726 A 2/1983 Churchill et al.
4,448,419 A 5/1984 Hedges et al.
4,467,424 A 8/1984 Hedges et al.
4,494,197 A 1/1985 Troy et al.
4,582,324 A 4/1986 Koza et al.
4,652,998 A 3/1987 Koza et al.
4,669,730 A 6/1987 Small
4,689,742 A 8/1987 Troy et al.
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis (Continued)

FOREIGN PATENT DOCUMENTS

CA 2273458 A1 1/2000

(Continued)

OTHER PUBLICATIONS

Examination Report from corresponding European Patent Application No. 05 796 134.4 — 2221, dated Jul. 6, 2007 (5 pages).

(Continued)

*Primary Examiner* — Ronald Laneau

(74) *Attorney, Agent, or Firm* — Weaver Austin Villeneuve & Sampson LLP

(57) ABSTRACT

A remote gaming system and method provides for portable memory devices having predetermined game play outcomes for play on PGDs. The portable memory device having a memory to store at least one predetermined game play outcome for a wager-based game, a processor coupled to the memory, and a biometric sensor. The biometric sensor to measure at least one biometric data from a user to access the wager-based game. A remote gaming server may be in electronic communication with the PGDs or portable memory device to store the predetermined game play outcomes for the wager-based game on the portable memory device.

44 Claims, 5 Drawing Sheets

U.S. PATENT DOCUMENTS

| | | | |
|---|---|---|---|
| 4,882,473 | A | 11/1989 | Bergeron et al. |
| 4,982,337 | A | 1/1991 | Burr et al. |
| 5,007,649 | A | 4/1991 | Richardson |
| 5,038,022 | A | 8/1991 | Lucero |
| 5,042,809 | A | 8/1991 | Richardson |
| 5,054,787 | A | 10/1991 | Richardson |
| 5,119,295 | A | 6/1992 | Kapur |
| 5,158,293 | A | 10/1992 | Mullins |
| 5,178,389 | A | 1/1993 | Bentley et al. |
| 5,223,698 | A | 6/1993 | Kapur |
| 5,276,312 | A | 1/1994 | McCarthy |
| 5,297,802 | A | 3/1994 | Pocock et al. |
| 5,324,035 | A | 6/1994 | Morris et al. |
| 5,326,104 | A | 7/1994 | Pease et al. |
| 5,351,970 | A | 10/1994 | Fioretti |
| 5,398,932 | A | 3/1995 | Eberhardt et al. |
| 5,580,311 | A | 12/1996 | Haste, III |
| 5,595,538 | A | 1/1997 | Haste, III |
| 5,628,684 | A | 5/1997 | Bouedec |
| 5,657,899 | A | 8/1997 | Stoken |
| 5,674,128 | A | 10/1997 | Holch et al. |
| 5,735,432 | A | 4/1998 | Stoken et al. |
| 5,738,583 | A | 4/1998 | Comas et al. |
| 5,770,533 | A | 6/1998 | Franchi |
| 5,779,545 | A | 7/1998 | Berg et al. |
| 5,800,269 | A | 9/1998 | Holch et al. |
| 5,830,067 | A | 11/1998 | Graves et al. |
| 5,871,398 | A | 2/1999 | Schneier et al. |
| 5,915,023 | A | 6/1999 | Bernstein |
| 5,928,082 | A | 7/1999 | Clapper, Jr. |
| 5,941,771 | A | 8/1999 | Haste, III |
| 5,944,606 | A | 8/1999 | Gerow |
| 5,949,042 | A | 9/1999 | Dietz, II et al. |
| 5,954,582 | A | 9/1999 | Zach |
| 5,970,143 | A | 10/1999 | Schneier et al. |
| 5,999,808 | A | 12/1999 | LaDue |
| 6,001,016 | A | 12/1999 | Walker et al. |
| 6,012,983 | A | 1/2000 | Walker et al. |
| 6,024,640 | A | 2/2000 | Walker et al. |
| 6,048,269 | A | 4/2000 | Burns et al. |
| 6,056,289 | A | 5/2000 | Clapper, Jr. |
| 6,089,982 | A | 7/2000 | Holch et al. |
| 6,099,408 | A | 8/2000 | Schneier et al. |
| 6,110,041 | A | 8/2000 | Walker et al. |
| 6,168,521 | B1 | 1/2001 | Luciano et al. |
| 6,183,361 | B1 | 2/2001 | Cummings et al. |
| 6,220,961 | B1 | 4/2001 | Keane et al. |
| 6,227,972 | B1 | 5/2001 | Walker et al. |
| 6,241,606 | B1 | 6/2001 | Riendeau et al. |
| 6,254,480 | B1 | 7/2001 | Zach |
| 6,270,410 | B1 | 8/2001 | DeMar et al. |
| 6,273,820 | B1 | 8/2001 | Haste, III |
| 6,280,326 | B1 | 8/2001 | Saunders |
| 6,280,328 | B1 | 8/2001 | Holch et al. |
| 6,302,791 | B1 | 10/2001 | Frohm et al. |
| 6,302,793 | B1 | 10/2001 | Fertitta, III et al. |
| 6,306,038 | B1 | 10/2001 | Graves et al. |
| 6,308,887 | B1 | 10/2001 | Korman et al. |
| 6,309,298 | B1 | 10/2001 | Gerow |
| 6,340,331 | B1 | 1/2002 | Saunders et al. |
| 6,358,151 | B1 | 3/2002 | Enzminger et al. |
| 6,368,218 | B2 | 4/2002 | Angell, Jr. |
| 6,402,614 | B1 | 6/2002 | Schneier et al. |
| 6,416,414 | B1 | 7/2002 | Stadelmann |
| 6,419,583 | B1 | 7/2002 | Crumby et al. |
| 6,447,395 | B1 | 9/2002 | Stevens |
| 6,450,885 | B2 | 9/2002 | Schneier et al. |
| 6,454,648 | B1 | 9/2002 | Kelly et al. |
| 6,475,086 | B2 | 11/2002 | Zach |
| 6,488,585 | B1 | 12/2002 | Wells et al. |
| 6,502,116 | B1 | 12/2002 | Kelly et al. |
| 6,508,711 | B1 | 1/2003 | Ono |
| 6,527,638 | B1 | 3/2003 | Walker et al. |
| 6,533,664 | B1 | 3/2003 | Crumby |
| 6,537,150 | B1 | 3/2003 | Luciano et al. |
| 6,554,707 | B1 | 4/2003 | Sinclair et al. |
| 6,599,187 | B2 | 7/2003 | Gerow |
| 6,607,439 | B2 | 8/2003 | Schneier et al. |
| 6,628,939 | B2 | 9/2003 | Paulsen |
| 6,656,040 | B1 | 12/2003 | Brosnan et al. |
| 6,729,961 | B1 | 5/2004 | Millerschone |
| 6,837,789 | B2 | 1/2005 | Garahi et al. |
| 6,843,725 | B2 | 1/2005 | Nelson |
| 6,942,570 | B2 | 9/2005 | Schneier et al. |
| 7,008,317 | B2 | 3/2006 | Cote et al. |
| 2001/0041612 | A1 | 11/2001 | Garahi et al. |
| 2002/0010013 | A1 | 1/2002 | Walker et al. |
| 2002/0016202 | A1 | 2/2002 | Fertitta, III et al. |
| 2002/0035538 | A1 | 3/2002 | Moreau |
| 2002/0060243 | A1 | 3/2002 | Janiak et al. |
| 2002/0039917 | A1 | 4/2002 | Armstrong et al. |
| 2002/0068629 | A1 | 6/2002 | Allen et al. |
| 2002/0069166 | A1 | 6/2002 | Moreau et al. |
| 2002/0072404 | A1 | 6/2002 | Gerow |
| 2002/0077173 | A1 | 6/2002 | Luciano et al. |
| 2002/0082070 | A1 | 6/2002 | Macke et al. |
| 2002/0082085 | A1 | 6/2002 | Osterer |
| 2002/0085515 | A1 | 7/2002 | Jaynes et al. |
| 2002/0089410 | A1 | 7/2002 | Janiak et al. |
| 2002/0090986 | A1 | 7/2002 | Cote et al. |
| 2002/0094871 | A1 | 7/2002 | Luciano et al. |
| 2002/0098882 | A1 | 7/2002 | Lind et al. |
| 2002/0103008 | A1 | 8/2002 | Rahn et al. |
| 2002/0111207 | A1 | 8/2002 | Lind et al. |
| 2002/0111213 | A1 | 8/2002 | McEntee et al. |
| 2002/0111214 | A1 | 8/2002 | Lind et al. |
| 2002/0113369 | A1 | 8/2002 | Weingardt |
| 2002/0119800 | A1 | 8/2002 | Jaggers et al. |
| 2002/0132661 | A1 | 9/2002 | Lind et al. |
| 2002/0169018 | A1 | 11/2002 | Schneier et al. |
| 2002/0193099 | A1 | 12/2002 | Paulsen |
| 2003/0022719 | A1 | 1/2003 | Donald et al. |
| 2003/0032473 | A1 | 2/2003 | Rowe et al. |
| 2003/0104865 | A1 | 6/2003 | Itkis et al. |
| 2003/0125101 | A1 | 7/2003 | Campo |
| 2003/0130029 | A1 | 7/2003 | Crumby et al. |
| 2003/0144053 | A1 | 7/2003 | Michaelson |
| 2003/0159044 | A1 | 8/2003 | Doyle et al. |
| 2003/0162591 | A1 | 8/2003 | Nguyen et al. |
| 2004/0038723 | A1 | 2/2004 | Schneier et al. |
| 2004/0053675 | A1 | 3/2004 | Nguyen et al. |
| 2004/0137987 | A1 | 7/2004 | Nguyen et al. |
| 2004/0214625 | A1 | 10/2004 | Millerschone |
| 2004/0235550 | A1 | 11/2004 | McNally et al. |
| 2005/0021350 | A1 | 1/2005 | Scott et al. |
| 2005/0031666 | A1 | 4/2005 | Nguyen et al. |
| 2005/0124407 | A1 | 6/2005 | Rowe et al. |
| 2005/0130728 | A1 | 6/2005 | Nguyen et al. |
| 2005/0181870 | A1 | 8/2005 | Nguyen et al. |
| 2006/0189382 | A1 * | 8/2006 | Muir et al. ...................... 463/29 |
| 2006/0247064 | A1 * | 11/2006 | Nguyen et al. .................. 463/43 |
| 2007/0021198 | A1 * | 1/2007 | Muir et al. ...................... 463/29 |
| 2008/0076505 | A1 * | 3/2008 | Nguyen et al. .................. 463/16 |

FOREIGN PATENT DOCUMENTS

| | | | |
|---|---|---|---|
| EP | 360613 | | 3/1990 |
| EP | 0360613 | | 3/1990 |
| EP | 0631247 | A2 | 6/1994 |
| EP | 1068885 | | 1/2001 |
| GB | 2161629 | A | 1/1986 |
| RU | 2145116 | C1 | 1/2000 |
| WO | 97/19428 | | 5/1997 |
| WO | 98/35309 | | 8/1998 |
| WO | WO02/102483 | A1 | 12/2002 |
| WO | WO02/103550 | | 12/2002 |
| WO | WO03/005743 | | 1/2003 |
| WO | WO03/008057 | A1 | 1/2003 |
| WO | 2005/031666 | | 4/2005 |
| WO | WO2005/031666 | | 4/2005 |

OTHER PUBLICATIONS

PCT Application No. PCT/US2005/021350 International Search Report dated Sep. 19, 2005.

PCT Application No. PCT/US2005/032334 International Search Report and Opinion dated Jan. 24, 2006.

PCT Application No. PCT/US2005/021350 Written Opinion dated Sep. 19, 2005.

PCT Application No. PCT/US2004/031315 Written Opinion dated Jan. 19, 2005.
Author unknown, "The Tube," Business Week, Mar. 6, 2000.
Author unknown, "Smart Cubicles," Business Week, Mar. 6, 2000.
Author unknown, "Call My Agent," Business Week, Mar. 6, 2000.
Press Room, "Quarter Play: The Instant-Scratch Game Goes Electronic", Apr. 27, 2005, http://www.ialottery.com/PressRoom/N10-01-04.html, 2pgs.
U.S. Appl. No. 10/937,989, filed on Sep. 10, 2004.
U.S. Appl. No. 10/995,636, filed on Nov. 22, 2004.
U.S. Appl. No. 10/897,822, filed on Jul. 22, 2004.
U.S. Appl. No. 10/937,990, filed on Sep. 10, 2004.
U.S. Appl. No. 11/155,702, filed on Jun. 16, 2005.
U.S.Appl. No. 10/672,307, filed on Sep. 26, 2003.
International Search Report and Written Opinion dated Jan. 24, 2006 for International Patent Application No. PCT/US2005/032334 (13 pages). (IGT1P195WO).
Notification Concerning Transmittal of Copy of International Preliminary Report on Patentability dated Mar. 22, 2007 from PCT Application No. PCT/US2005/032334 (IGT1P195WO).
International Search Report and Written Opinion dated Jan. 15, 2008 for PCT Publication No. WO 2008/005236. [IGT1P195X1WO].
International Preliminary Report on Patentability dated Jan. 15, 2009 for PCT Publication No. WO 2008/005236. [IGT1P195X1WO].
Office Action dated Sep. 12, 2007, for U.S. Appl. No. 10/937,989. (IGT1P195).
Final Office Action dated Mar. 26, 2008, from U.S. Appl. No. 10/937,989 (IGT1P195).
Office Action dated Sep. 17, 2008 from U.S. Appl. No. 10/937,989 (IGT1P195).
Office Action dated Apr. 6, 2009 from U.S. Appl. No. 10/937,989 (IGT1P195).
Office Action dated Sep. 24, 2009 from U.S. Appl. No. 10/937,989 (IGT1P195).
Summons to attend Oral Proceedings Pursuant to Rule 115(1) EPC dated Jan. 15, 2008, from EP Application No. 05796134.4—2221. (IGT1P195EP).
Telephone Consultation dated Oct. 28, 2008 for EP Application No. 05796134.4-2221. (IGT1P195EP).
Decision to Refuse a European Patent Application dated Feb. 25, 2009, from EP Patent Application No. 05 796 134.4—2221. (IGT1P195EP).
Press Room, Quarter Play: The Instant-Scratch Game Goes Electronic, dated Oct. 1, 2004 http://www.ialottery.com/PressRoom/N10-01-04.html (2 pages).
Rankl et al. "Handbuch der Chipkarten", 1999, 3 pages.
Rankl et al. "Smart Card Handbook," Chapter 2, Third Edition 2003. This is a Translation for "Handbuch der Chipakarten".
Final Office Action dated Apr. 29, 2010, from U.S. Appl. No. 10/937,989.
Examination Report dated May 6, 2010, for Australian Patent Application Serial No. 2005285100.

* cited by examiner

APPARATUS FOR PRE-DETERMINED GAME OUTCOMES

CROSS-REFERENCE TO RELATED APPLICATIONS

This application is a Continuation-in-Part of U.S. patent application Ser. No. 10/937,989, titled "APPARATUS FOR PRE-DETERMINED GAME OUTCOMES", filed Sep. 10, 2004, of which is herein incorporated by reference in its entirety.

TECHNICAL FIELD

The present invention relates generally to portable gaming devices and systems, and more specifically to portable memory devices having predetermined game play outcomes for play on gaming devices.

BACKGROUND

Gaming is an increasingly popular industry, with casinos and other gaming establishments continually seeking new and exciting ways to present games for play. Many games are generally presented on large free-standing gaming devices, such as the well known slot machines, video poker machines and the like. Other games can be presented at something other than a gaming device, such as the table games of craps, blackjack and roulette. In addition, games such as keno and bingo may be played in areas specially configured to present the game to players (e.g., at areas where personnel pick up keno cards and called numbers are displayed on large displays).

Such wager-based games allow the casino customers to place bets or wagers that result in winnings if the wager is successful, or losses if the wager is unsuccessful. A substantial disadvantage to the way such games are currently presented is that a player may participate in a particular game only at certain specified locations and/or on specific gaming machines or tables. For example, in order to play video poker or a particular slots game, such as "Red White and Blue," a player may be required to travel through a large hotel and/or casino to a specific gaming area where an actual video poker or "Red White and Blue" gaming machine is located.

Casinos and other gaming operators generally desire to provide to their customers greater accessibility to gaming devices and the opportunity to play games. Of course, added issues can arise whenever players are permitted to engage in gaming events from mobile and/or remote locations, such as through the use of a personal gaming device (PGD). Security for any casino owned PGDs, increased fraud prevention, flexibility in PGD use, and player authentication and verification are only a few examples of such added issues. Furthermore, PGDs are more apt to be stolen, which then allows the thieves to play and collect any winnings from the purchased predetermined games. Additionally, since PGDs are mobile, it is also easier for minors to gain access to play the wager-based games on the PGDs.

In light of the foregoing, it is desirable to develop additional methods and systems that provide for improved functionality in mobile gaming involving PGDs, and in particular for such methods and systems to include enhanced security and player authentication features while remaining at similar or better levels of flexibility as on large free-standing gaming devices.

SUMMARY

The present invention is directed to a gaming apparatus involving pre-purchased predetermined game outcomes stored on a portable memory device, which could be used with either a PGD or a casino gaming system. The portable memory device may have a memory to store at least one predetermined game play outcome for a wager-based game, a processor coupled to the memory, and a biometric sensor. The memory may be used to store at least one predetermined game play outcome for a wager-based game.

The portable memory device may be interchangeable with at least one portable gaming device having an interface for receiving and reading the portable memory device, a display, and a controller operatively coupled to the display and the input device. The controller may have a processor having a memory operatively coupled to the processor, the controller being programmed to cause the display to generate a game display relating to the at least one wager-based game, to accept a wager for the at least one wager-based game, and to display the at least one predetermined game play outcome.

The portable memory device may also have a biometric sensor to measure at least one biometric data from a user to access the wager-based game. A remote gaming server may be in electronic communication with the PGD and adapted to provide the at least one predetermined game play outcome for the wager-based game to the portable memory device.

The present invention also provides for a method for playing the wager-based game on a portable gaming device. A reference biometric data is stored on the PGD, portable memory device, or both. At least one predetermined game play outcome for the wager-based game is stored and encrypted on the memory of the portable memory device. The portable memory device is inserted into the PGD and biometric data is measured from the player on the portable memory device, or alternatively also on the PGD. The measured biometric data is compared to the reference biometric data. If the reference and measured biometric data are the same, the predetermined game play outcome is sent to the PGD for play by the player.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Exemplary applications of systems and methods are described in this section. Embodiments are described herein in the context of an apparatus for pre-determined game outcomes. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In general, the present invention is directed to a gaming apparatus involving pre-purchased predetermined game outcomes, which could be used with either an individual gaming unit or a casino gaming system. The PGD or casino gaming system may provide for at least one game of chance requiring that a player place a monetary wager in order to be entitled to play the game, whereupon one or more game outcomes can result in a monetary or other award being granted to the player.

Figure 1:
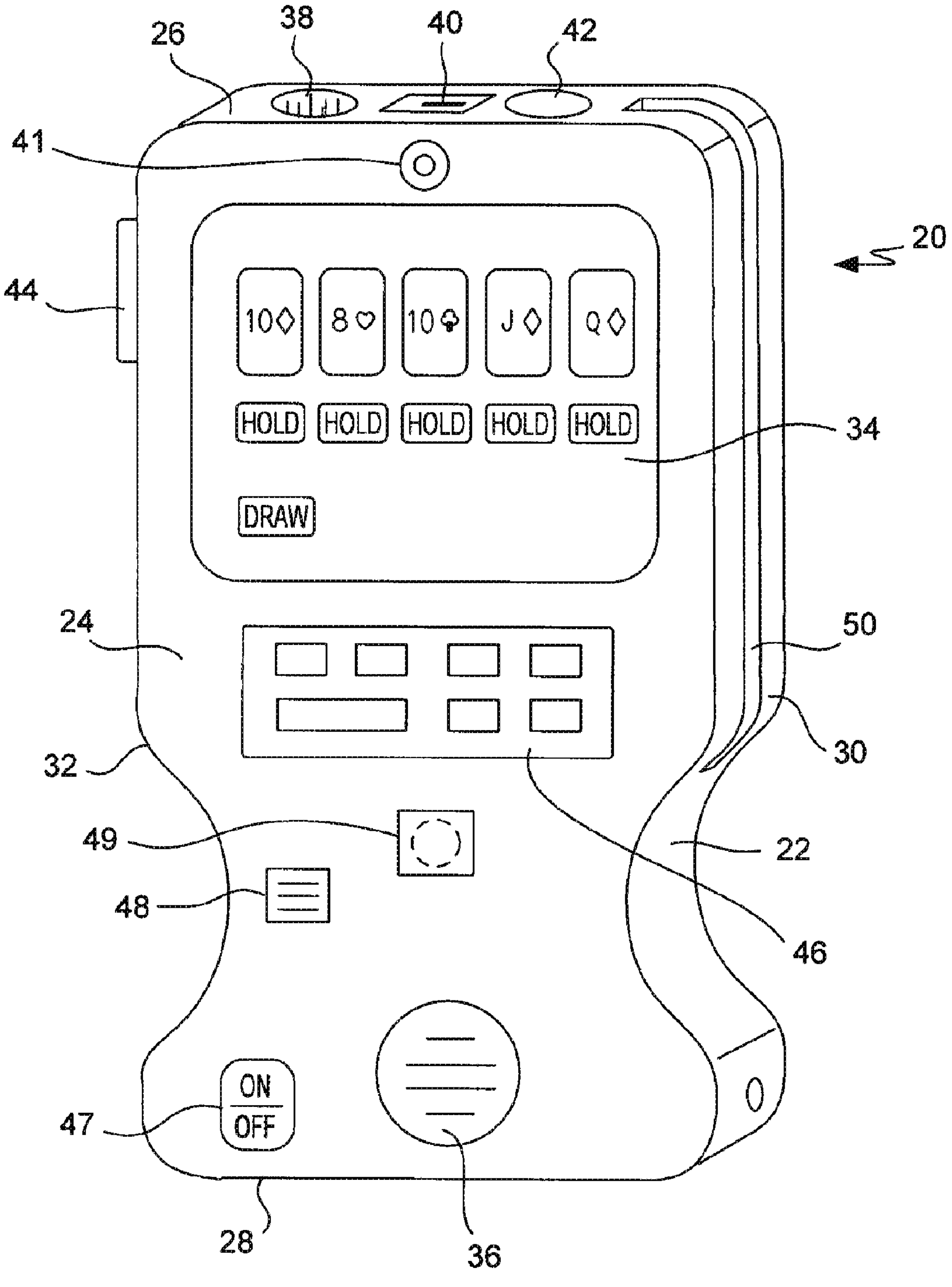
FIG. 1 is a perspective view of an exemplary PGD in accordance with an embodiment of the invention.

The individual gaming unit may be a PGD that is adapted to present a wager-based game for play by a player. An example is described in co-pending patent application Ser. No. 11/155,702, filed Jun. 16, 2005, entitled "Virtual Leash For Personal Gaming Device" and co-pending patent application Ser. No. 10/672,307, filed Sep. 26, 2003, entitled "Personal Gaming Device and Method Of Presenting a Game" which are incorporated herein in their entirety for all purposes. FIG. 1 illustrates an exemplary PGD, generally numbered 20, in accordance with one embodiment of the invention. In general, the PGD 20 includes a body or housing 22. The body 22 may be constructed from a wide variety of materials and in a wide variety of shapes. In one embodiment, the body 22 is constructed from one or more molded polypropylene or other plastic components. The body 22 may be constructed of metal or a wide variety of other materials. As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located.

In a preferred embodiment, the PGD 20 is adapted to present video and sound game data to a player. As illustrated, the PGD 20 includes a display 34. The display is located in the front face 24 of the body 22, thus facing upwardly towards a player. In a preferred embodiment, the display 34 comprises a liquid crystal display ("LCD"), and in particular, an LCD permitting touch-screen input. It will be appreciated that other types of displays may be provided. PGD 20 also includes a sound generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30, 32 of the body 22.

In a preferred embodiment, the PGD 20 is adapted to send and/or receive data from another device. As such, the PGD 20 includes one or more data input and/or output devices or interfaces. In one embodiment, the PGD 20 includes an RS-232 data port 38 for transmitting and accepting data, such as through a cable extending between the PGD 20 and another device, such as a computer. In one embodiment, the PGD 20 includes a USB data port 40 for transmitting and accepting data, also through a cable. In one embodiment, the PGD 20 includes an infrared data transmitter/receiver 42 for transmitting information in wireless, infrared light form. In a preferred embodiment, the PGD 20 includes another wireless communication device 44, such as a wireless communication device/interface operating at radio frequency, such as in accordance with the IEEE-802.1x or the Bluetooth™ standard.

Preferably, a player is permitted to provide input to the PGD 20, such as for playing a game. As stated above, one means of input may be through the display 34. The display 34 may also be arranged to accept input via a stylus or other device. In one embodiment, the PGD 20 includes a keypad 46. In one or more embodiments, the keypad 46 is a sealed keypad having one or more keys or buttons which may be activated by a player, such as by depressing the button with their finger. The PGD 20 can include a microphone 48 arranged to accept voice input from a player. Other input devices may alternatively be provided or be provided in addition to those input devices described. For example, a player may be permitted to provide input through a joystick (not shown). The joystick may comprise a control element associated directly with the body 22 of the PGD 20. Alternatively, the joystick may be separate from the PGD 20, and then be placed in communication therewith, such as by plugging in the joystick to a data port of PGD 20. A smart card reader, optical reader, memory card slot, or other input device may be provided for reading information from another element, such as a card, magnetic stripe, flash memory cards, ticket or the like. PGD may also include a keyboard or mouse.

In one embodiment, the PGD 20 includes an image collection device 41, such as a camera. The image collection device 41 may be used, for example, to capture the image of a user or player of the PGD 20. This image information may be used for security or authentication purposes, as set forth in greater detail below. The PGD 20 may also include a fingerprint scanner 49. In one embodiment, as illustrated, the fingerprint scanner 49 may be located behind or beneath a user input button, such as a "spin" or "draw" button. In this manner, a player's fingerprint may be obtained without the user or player having to consciously participate. As described below, a player's scanned fingerprint information may be used for authentication purposes. The PGD 20 may include a card reader 50. As illustrated, the card reader 50 is located in a side 30 of the body 22 of the PGD 20. In a preferred embodiment, the card reader 50 comprises a magnetic stripe reader for reading information from a magnetic stripe of a card. The card reader may also be adapted to write or store data to a smart card or portable memory module.

As illustrated, the card reader 50 includes a slot that is positioned in the side 30 of the PGD 20. The PGD 20 may be battery-powered, such as with a rechargeable battery pack. An ON/OFF button 47 may be provided for controlling the power to the PGD 20. The PGD 20 may be docked at or otherwise associated with a free-standing gaming machine or other gaming device. At such times that the PGD 20 is docked, the internal battery of the device can be recharged for later use in an undocked or "remote" mode, as will be readily appreciated. Appropriate detection provisions, warnings and safeguards for a low battery status in PGD 20 while in such a remote mode can also be provided.

Figure 2:
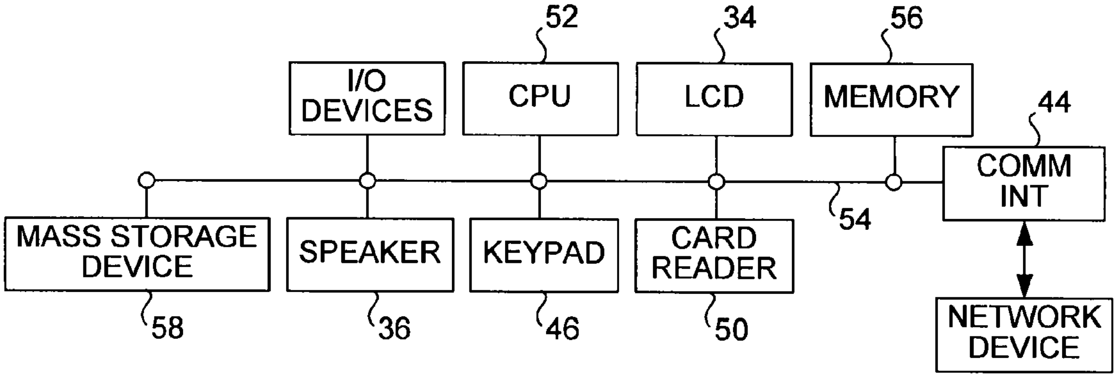
FIG. 2 is a block diagram of an exemplary component arrangement of the PGD illustrated in FIG. 1.

Preferably, PGD 20 includes control means for controlling the operation of the device, including accepting input and providing output. One embodiment of such a control means is illustrated in FIG. 2, a block diagram of an exemplary component arrangement of the PGD illustrated in FIG. 1. As illustrated, PGD 20 preferably includes a computing environment serving as the control means. The computing environment includes a central processing unit 52. The central processing unit 52 preferably comprises a microprocessor. The central processing unit 52 is associated with a bi-directional system bus 54. The system bus 54 may contain, address lines for addressing a video memory or main memory. In addition, the system bus 54 include a data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a cathode ray tube (CRT) or other suitable display device. A memory 56 is associated with the system bus 54. In one embodiment, the memory 56 comprises dynamic random access memory ("DRAM"), synchronous DRAM or other forms of random access memory. The memory 56 may have other forms as well, such as electronically erasable programmable read only memory ("EEPROM"). Preferably, the memory 56 is of the type that permits data to be written thereto and read there from. A mass storage device 58 is preferably also accessible via the bus 54. The mass storage device 58 may be of the read-only type (such as a CD or DVD optical drive) or may be of the read-and-write variety such as flash memory, compact flash, or CD/DVD-R/W drives.

As illustrated, the variety of input and output devices can be associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared data transmitter/receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with the PGD 20, as now known or later developed.

As stated above, the PGD 20 may include the wireless communication device 44. The architectures/protocols of such wireless communication interfaces are well known and thus will not be described in detail herein. In general, however, such an interface 44 permits two-way data communication. The PGD 20 may be permitted to communicate with a wide variety of devices/systems, including at least one device associated with a gaming network. The PGD 20 may send and receive data, including program code, through the wireless communication device 44 (or the other input/output devices, such as the infrared transmitter/receiver). As one example described in more detail below, a gaming server may transmit requested code for an application via a transceiver to the wireless communication device 44 of the PGD 20. The received code may be executed by the central processing unit 52 as it is received and/or be stored in the memory 56 for later execution. In one embodiment, the PGD 20 may include a mass data storage device (not shown) such as a hard drive, CD-ROM or the like. In one or more embodiments, the memory 56 may comprise a smart card or similar easily removable (and replaceable) device. In such event, data, such as operating code, may be associated with the PGD 20 via a CD-ROM placed in a CD-ROM drive or by insertion of a coded smart card or portable memory device.

Although the foregoing exemplary PGD 20 is fairly specific with respect to many details, it will be readily appreciated that a wide variety of similarly suitable devices can also be used as a PGD. As discussed herein, it will be understood that use of the term "PGD" can refer to the exemplary PGD 20 disclosed above, as well as any other suitable device that can serve as a PGD for any purpose of the present invention, and that such a device or devices may or may not be portable or hand-held. Further, while use of the terms "portable" and "mobile" gaming device are used, it is understood that use of other suitable non-portable PGDs may be substituted in relevant instances.

Figure 3:
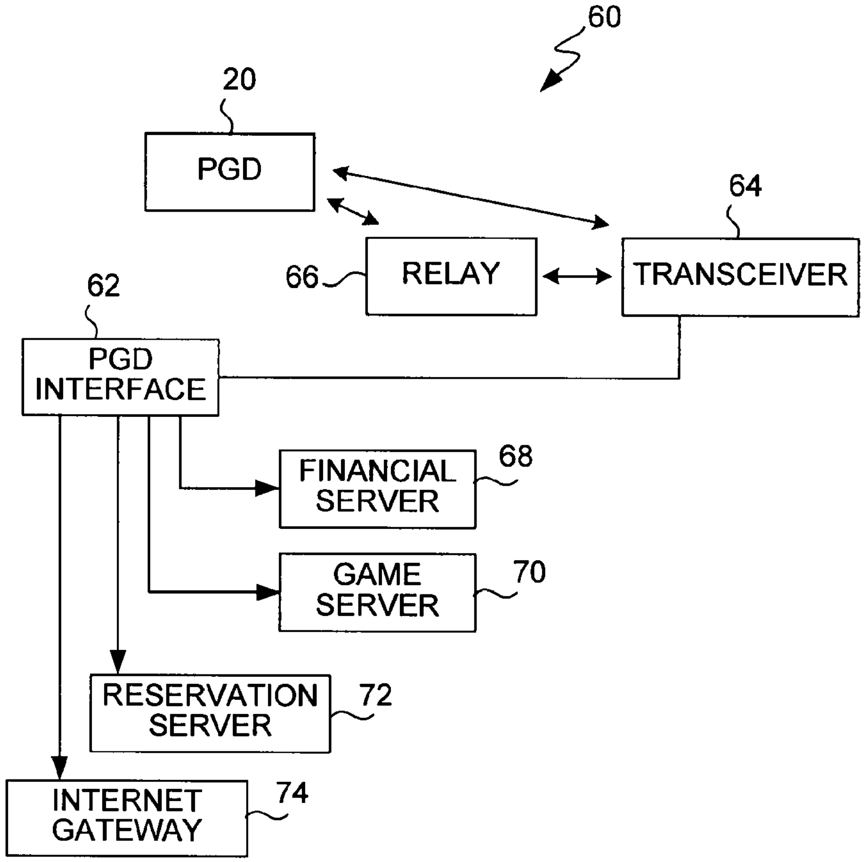
FIG. 3 is a schematic of an exemplary gaming system including a PGD in accordance with the invention.

FIG. 3 is a schematic of an exemplary gaming system including a PGD in accordance with the invention. As illustrated therein, the gaming system, generally numbered 60, includes a personal gaming device interface 62. This PGD interface 62 serves as a gateway to data communications between the PGD 20 and various networks, servers and other devices. In one embodiment, data communications between the PGD 20 and the PGD interface 62 is via a transceiver 64 associated with the PGD interface 62. In general, the transceiver is arranged to receive information from the PGD interface 62 and transmit it to the PGD 20 and/or receive information from the PGD 20. As illustrated, a PGD 20 may communicate directly with the transceiver 64. It will be appreciated, however, that limitations may exist as to the range over which such data can be accurately transmitted. Therefore, in one or more embodiments, one or more relays 66 may be provided for receiving and re-transmitting the data to the appropriate location.

As stated above, in a preferred embodiment, the PGD interface 62 serves as a gateway or interface between the one or more PGDs 20 and one or more other devices, systems or networks. The interface 62, whether in the form of a wireless interface or a docking station, may be associated with or reside in a kiosk, slot or other type of gaming machine, a point of sale device, a personal computer or the like. As illustrated, in one embodiment, the PGD interface 62 is associated with a financial server 68 either via a direct link (as illustrated in FIG. 3) or via a network. The financial server 68 may be a computer or be associated with a computer having a processing unit and one or more data files. The financial server 68 is preferably arranged to confirm financial transaction data. For example, in order for player to be permitted to play a game using the PGD 20, the player may be required to place a bet. In one embodiment, the portable memory device may be updated using a credit card. In such event, the player may swipe their credit card using the card reader 50 associated with the PGD 20. This data may be transmitted to the financial server 68 for confirmation (and as is known in the art, generation of financial transaction data, such as a transaction date, time and value).

In one embodiment, the system 60 includes a game server 70. As illustrated, the game server 70 is associated with the PGD interface 62, either directly or via a network. In one or more embodiments, the game server 70 is, or is associated with, a computing device, such as a processor adapted to execute game code. Preferably, the game server 70 is arranged to provide game data to the PGD 20 via the interface 62. This game data may comprise video data for generating an image on a display 34 of the PGD 20, and sound data for generating sound emitted by the speaker 36. The game server 70 is preferably also adapted to receive input from a player, such as a player selection during the play of a game. In one embodiment, a reservation server 72 is connected to the PGD interface 62, either directly or via a network. The reservation server 72 may be arranged to accept reservation selections, and provide information regarding available hotel rooms, rates, shows, restaurants and the like for use by a player of the PGD 20 in making a reservation selection. While the PGD 20 may communicate with other devices via direct network links as illustrated in FIG. 2, the PGD 20 may communicate with a variety of other devices (via a wired or wireless connection) such as the portable memory device, a printer, kiosk, cell phone, slot machine, another computer, and the like. Internet gateway 74 may also used to allow the PGD 20 to connect to other services available on the Internet.

Figure 4:
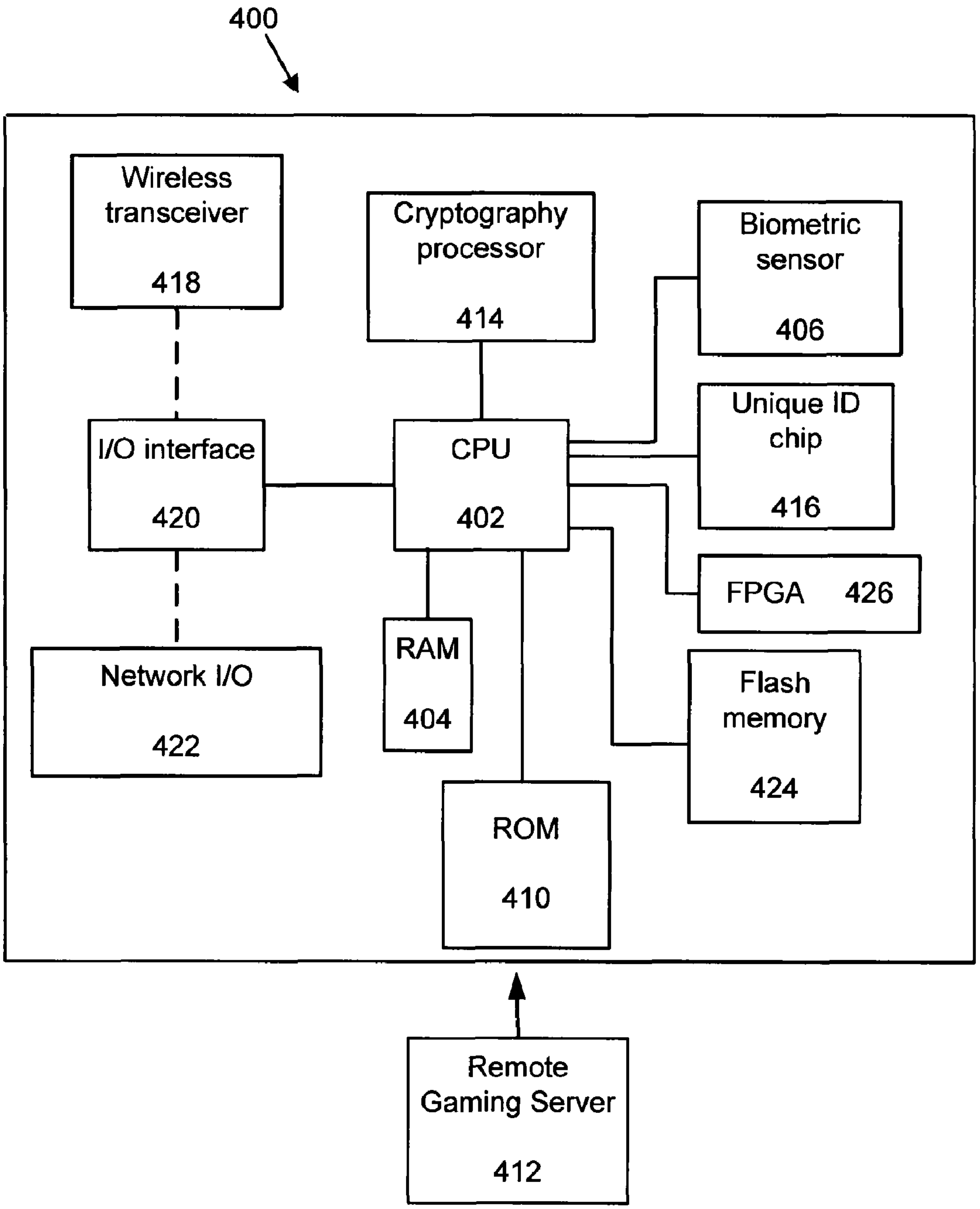
FIG. 4 is a block diagram of components within an exemplary portable memory device according to one embodiment of the present invention.

FIG. 4 is a block diagram of the components within an exemplary portable memory device according to one embodiment of the present invention. The portable memory device, generally numbered 400, is a separate and detachable device from the PGD. The portable memory device 400 may be any memory device such as a memory "stick", proprietary cartridge, USB drive, player tracking card with a magnetic stripe, smart card, flash memory, recordable integrated circuit, magnetic or optical memory such as a floppy disc or compact disc, specially adapted active RFID unit, or any other memory devices that may remain in the personal possession of the player and may be removably and communicatively coupled to the PGD.

As will be described in detail below, a biometric sensor on the portable memory device verifies the player, which allows the player to play the wager-based games on any PGD. This allows a player to play the pre-purchased, predetermined games on any PGD and not be limited to the use of a single, specified PGD. The interchangeability of the portable memory device on any PGD also gives a player the flexibility to play the wager-based games at any time. For example, should the player have to stop a wager-based game in mid-play on a first PGD, the game may be saved on the portable memory device for the player to resume the game at the same stopping point on a different PGD if the first PGD is lost, has no power, or is for some reason unavailable for use. The portable memory device 400 may be used to store pre-purchased, predetermined game play outcomes for a wager-based game. The portable memory device may have a processor 402, field programmable gate array (FPGA) 426, a random-access memory (RAM) 404, and a read only memory (ROM) 410, each coupled to the processor 402. The ROM 410 may be used to store the operating system, drivers, authentication codes, certificate identification (which may be obtained from the remote gaming server or certificate authority 412), and other software that is to be read by the PGD controller. The computer program instructions and the predetermined game play outcomes stored in the ROM 410 may be encrypted (and decrypted) for security and fraud protection by the cryptography processor 414. A unique identification chip 416 may be coupled to the processor 402 and used with the ROM 410 to identify the device and user.

The predetermined game play outcomes may be obtained from the remote gaming server 412. The remote gaming server 412 may have a random number generator (RNG) to generate random numbers that correspond to outcomes of a game. The random numbers are then stored on the memory of the portable memory device. By storing the random numbers on the portable memory device, a RNG does not need to be installed on the PGD or portable memory device. This also allows the player to play wager-based games at any location without being in electronic communication with the remote gaming server. Thus, this allows the player to play one or more wager-based games at various locations, on various computing devices, and/or at various times, which may not be conducive to a system that centrally generates game outcomes. Examples of wager-based games are further discussed in detail in co-pending application Ser. Nos. 11/155,702 and 10/672,307 discussed above.

Additionally, this prevents the transfer of large portions of game play code to be downloaded onto a PGD or the portable memory device. The portable memory device may contain only the actual game play outcomes, which may also be referred to as "seeds". Within the context of a command download process, such "seeds" need only be the most basic form of predetermined game outcomes, with nothing more, as opposed to entire video clips of outcomes, game plays and presentations. The seeds are predetermined game play outcomes created at a remote gaming server. When using such basic game seeds, the game play and presentation can be made in a wide variety of ways to arrive at the predetermined game outcome or seed. In other words, each seed need only contain enough information for the PGD to determine the outcome of an actual game play, without telling the PGD how to present that outcome. A given command download of gaming software can provide enough information for a PGD to be able to run its own game presentations that ultimately result in game outcomes reflective of any game seeds that have been downloaded.

The portable memory device may be sold as an individual unit and may be updated at any purchase location such as a kiosk, that may or may not be in electronic communication with the remote gaming server, or at any cashier stations such as in the casino, gas stations, grocery stores, malls, and the like. In one arrangement, a casino may allow the player to check out the portable memory device. In another embodiment, the player may be required to leave a deposit to check or rent the portable memory device. The portable memory device may also be purchased for a specific wager amount for a specific number of wager-based games to be played. Thus, the portable memory device is purchased based upon a block of games to be paid for when purchasing or updating the portable memory device. For example, the player may purchase ten wager-based games based at $1.00 per game, for a total of $10.00. The player would not have to confirm payment for each game to be played when it is played, such as by credit card authorization. The player is able to pay for the pre-determined game play outcomes for a block of games at the same time. Once all the games are played, the portable memory device may be removably and communicatively coupled to the purchase locations, such as the kiosk, so that the player may collect any wins from the purchase location. As such, the portable memory device 400 may have an input/output (I/O) interface and may also have a network I/O 422. The interface 420 may be a USB, disc, or any other interfaces.

The biometric sensor 406 may be an additional security/fraud feature to allow the player to access the wager-based game. The biometric sensor may be a fingerprint imager, a retina print imager, a voice pattern imager, a facial component imager, and other similar devices to recognize and identify the player. The biometric sensor offers a reliable and inexpensive way to authenticate the identity of a player, which is more secure than personal identification numbers (PINs) or passwords, which are subject to being compromised or forgotten. Examples of portable memory devices may be the Micro Vault by Sony or the JumpDrive TouchGuard by Lexar.

Briefly, in one example utilizing the fingerprint imager, one or more fingers of the player must first be registered to obtain a reference biometric data. As the player places their fingertip on the fingerprint sensor, it detects and captures the small variations in finger surface-capacitance and creates a three-dimensional electrical image of the fingerprint's unique capillary pattern. These signals are verified and then stored into the memory of the portable memory device or PGD. The portably memory device or PGD is "locked" and subsequent placement of any finger on the sensor triggers a verification process, as discussed below. This involves comparing the reference biometric data with the measured biometric data.

A greater description of a finger print reader as an identification device is provided in U.S. Pat. No. 6,488,585, issued Dec. 3, 2002, to Wells, et al., entitled "Gaming Device Identification Method and Apparatus," which is incorporated by reference herein in its entirety and for all purposes. Other types of verification methods such as a PIN or a password may be used separately or in combination with biometric identification methods.

The reference biometric data may be stored on the memory of the portable memory device or on the PGD and may be encrypted for additional security. When obtaining either the portable memory device or PGD (i.e. upon sale, rental, etc. of the devices), the player must provide the reference biometric data at that time. The reference biometric data may be obtained by a separate sensor and alternatively stored in a central biometric database. Should the player want to purchase, rent, etc. additional portable memory devices or PGDs, the player needs to only register his fingerprint once. For example, the player may register his fingerprint with the casino, which may be saved and stored in a database of a remote gaming server. The reference biometric data may then be downloaded to the memory of the PGD or portable memory device. Should the player want to purchase, rent, etc. a second PGD or portable memory device, the casino may merely reuse the same reference biometric data for downloading onto the second PGD or portable memory device.

Alternatively, the reference biometric data may be stored on the ROM 410 of the portable memory device 400 or on the PGD prior to the first use of the device. If the reference biometric data is stored on the portable memory device 400, the portable memory device 400 may verify the data by comparing the measured biometric data with the reference biometric data. If the measured biometric data does not match the reference biometric data, the predetermined game play outcome is not decrypted or sent to the PGD controller for operation of the wager-based game. It is beneficial for the reference biometric data to be stored on the portable memory device since the player will be able to use the device on any PGD and/or at any stationary free standing gaming machine. On the other hand, if the reference biometric data is stored on the PGD, the player is limited to the use of that specific PGD.

However, it is possible for the reference biometric data to also be stored on the PGD as either a primary or secondary verification check. The reference biometric data ideally would be obtained and stored in the memory before the play of games on the PGD. In a primary verification process, the PGD controller would obtain the measured biometric data from the memory of the portable memory device and compare it to the reference biometric data stored in the PGD memory. Alternatively, the measured biometric data may be obtained from a biometric sensor on the PGD itself. If the measured biometric data does not match the reference biometric data, the PGD would not operate and/or allow the player to play the wager-based game. The PGD may also act as a secondary verification check. In addition to the verification done by the portable memory device, the PGD may also verify that the measured biometric data is matched to the reference biometric data. This would increase the security of the portable memory device and PGD.

Should the biometric data not match, the player would be informed during the verification process. The player may be informed, for example, with an audible alarm and/or message on the PGD. The player may also be advised to contact a casino representative to determine the origin of the data discrepancy.

There may be various ways in which game play discrepancies may be resolved. Where a player buys, for example, a block of 10 game seeds or game outcomes, these outcomes can preferably be saved at the remote gaming server before being transferred to the portable memory device. Should the player then claim a loss of power, battery failure, or other malfunction, the same exact 10 video clips or games seeds could be downloaded again at a later time, due to the recorded version being stored on the remote gaming server 412. The portable memory device 400 may also have a flash memory 424 store the game state, game history, license data, expiration dates, or any other information. In a preferred embodiment, the official version of any downloaded game outcome is the version that is stored at the remote gaming server 412, for both verification and security purposes. Thus, where a player presents a portable memory device that displays a final overall amount or game play balance that does not reconcile with the amount stored on the remote gaming server, the amount stored on the remote gaming server 412 can be the amount to be officially recognized. Disputes over differing amounts could be handled in a manner similar to other gaming machine or casino malfunctions or discrepancies.

Although not necessary, the POD and portable memory device may each have a transmitter/receiver or transceiver 418 to transmit and receive information from the remote gaming server. This would allow the player to buy additional blocks of game play without having to return to the purchase location. Additional purchases may be made with a credit card transaction, use of existing wins, or the like either through the use of the portable memory device or the POD.

Figure 5:
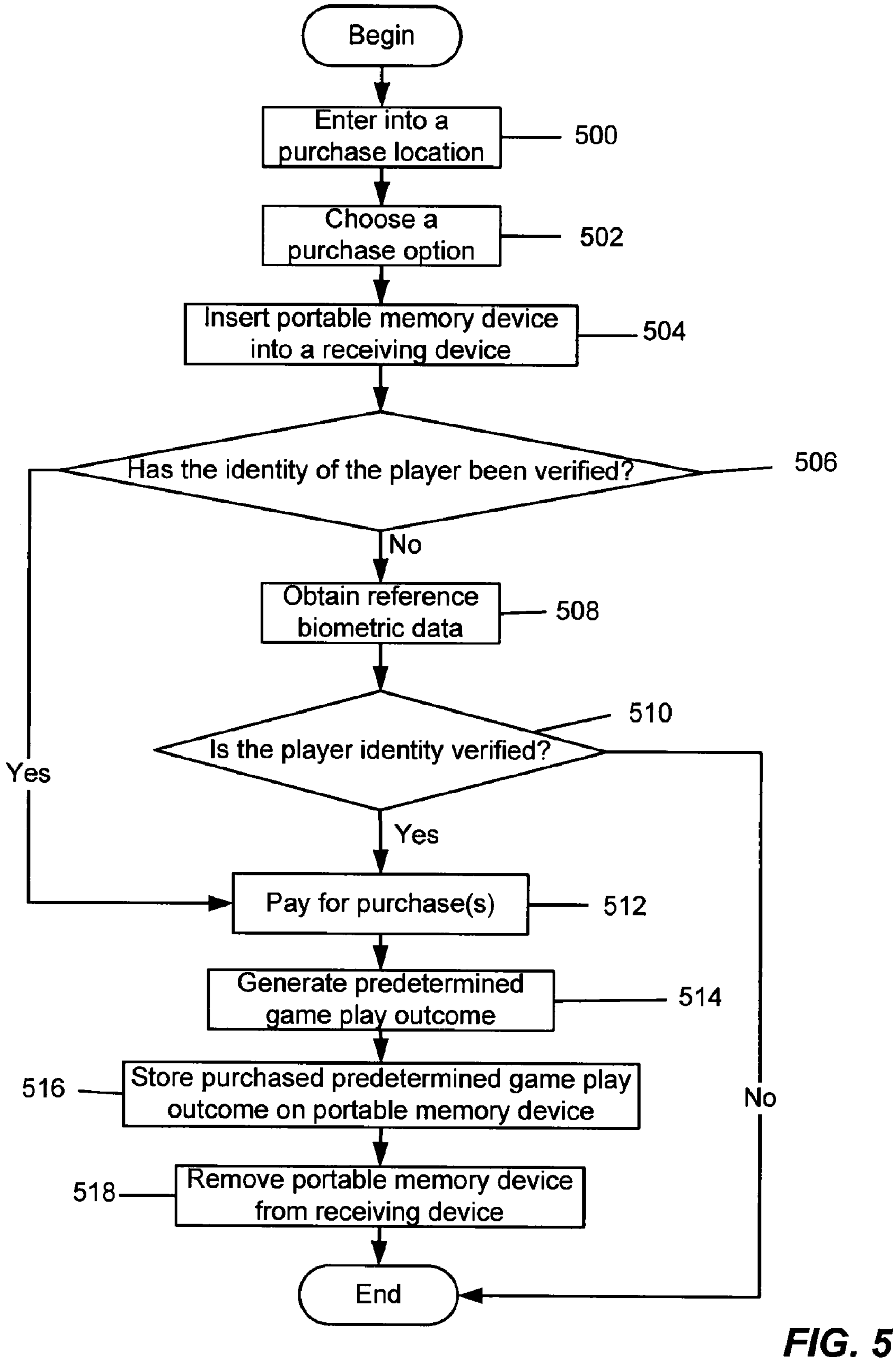
FIG. 5 is a flow chart illustrating an exemplary method for playing a wager-based game on a portable gaming device according to one embodiment of the present invention.

FIG. 5 is a flow chart illustrating an exemplary method for playing a wager-based game on a portable gaming device according to one embodiment of the present invention. The player may enter a purchase location at 500, such as a kiosk, cashier station, gas station, grocery store, mall, and the like. The player may then chose a purchase option at 502. The options may be to purchase a portable memory device, purchase additional predetermined game plays, collect winnings, etc. The portable memory device is inserted into a receiving device at the purchase location at 504. The receiving device may be any device that is able to read from and write to the portable memory device.

The identity of the player may be verified prior to inserting the portable memory device into the receiving device if the referenced biometric data is stored on the portable memory device. However, if the identity of the player is not verified at 506, the reference biometric data may be obtained from alternative sources at 508. For example, the reference biometric data may be obtained from a player tracking card that the player must swipe through the receiving device. In another embodiment, the reference biometric data may be obtained from a central biometric database at the casino.

Once the identity of the player is verified at 510, the player may pay for the purchase at 512. Alternatively, the player may also receive the winning from previous predetermined game play outcome games. The method of payment may be through the use of a bill validator, a cashless ticket, credit card, debit card, or any other similar methods of payment. Once paid for, the system may generate the predetermined game play outcomes at 514 and store them on the portable memory device at 516. The system may be the receiving device, a remote gaming server, a slot machine, or any other system that is able to generate the predetermined game play outcomes. The portable memory device may then be removed from the receiving device at 518 for play on a PGD.

Figure 6:
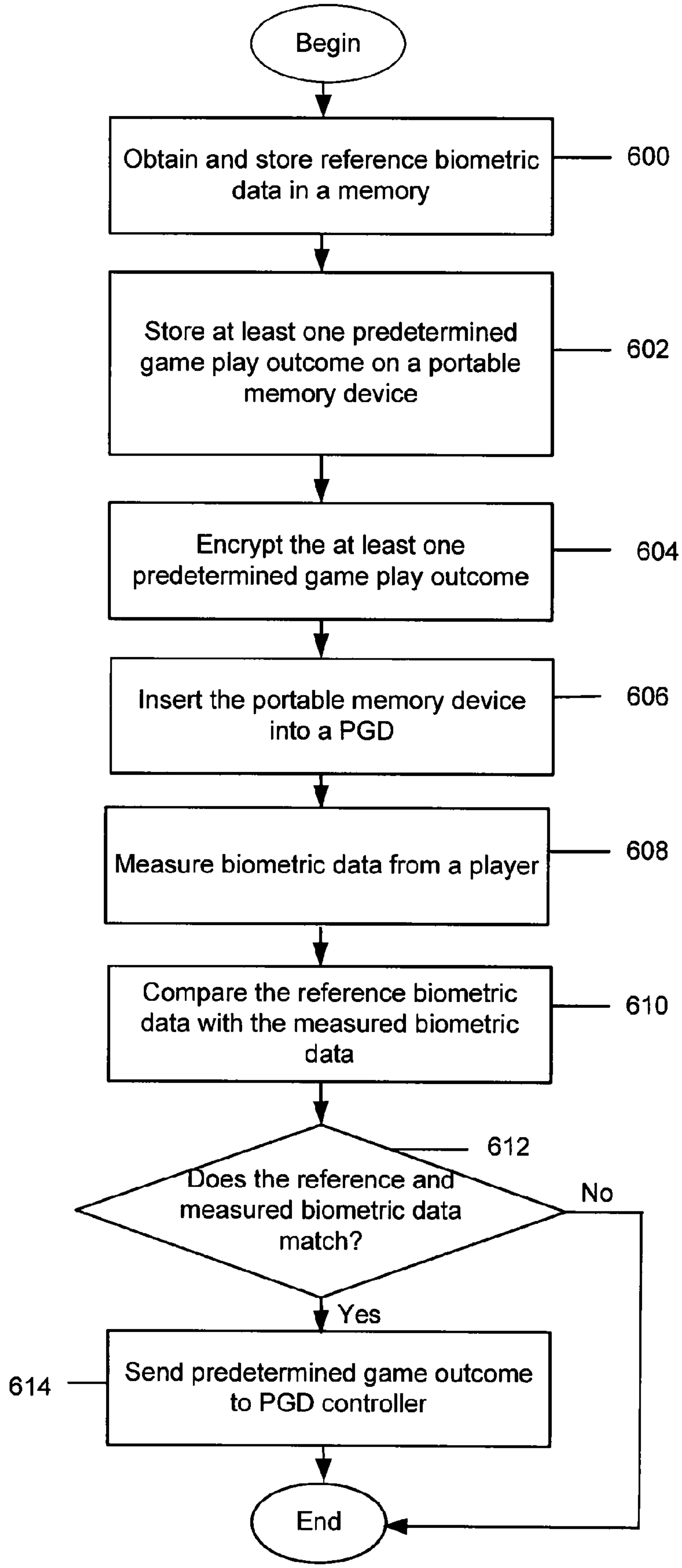
FIG. 6 is a flow chart illustrating an exemplary method for playing a wager-based game on a portable gaming device according to another embodiment of the present invention.

FIG. 6 is a flow chart illustrating another exemplary method for playing a wager-based game on a portable gaming device according to another embodiment of the present invention. A reference biometric data of a player may be obtained and stored in a memory at 600. The biometric sensor may be an additional security/fraud feature to allow the player to access the wager-based game and the reference biometric data may also be encrypted. The biometric sensor may be a fingerprint imager, a retina print imager, a voice pattern imager, a facial component imager, and other similar devices to recognize and identify the player. The biometric sensor offers a reliable and inexpensive way to authenticate the identity of a player, which is more secure than personal identification numbers (PINs) or passwords, which are subject to being compromised or forgotten.

The reference biometric data may be stored on the memory of the portable memory device or on the PGD. When obtaining either the portable memory device or PGD (i.e. upon sale, rental, etc. of the devices), the player must provide the reference biometric data at that time. The reference biometric data may be obtained by a separate sensor and also stored in a central biometric database. Should the player want to purchase, rent, etc. additional portable memory devices or PGDs, the player needs to only register his fingerprint once. For example, the player may register his fingerprint with the casino, which may be saved and stored in a database on the remote gaming server. The reference biometric data may then be downloaded to the memory of the PGD or portable memory device. Should the player want to purchase, rent, etc. a second PGD or portable memory device, the casino may merely reuse the same reference biometric data for downloading onto the second PGD or portable memory device.

Alternatively, the reference biometric data may be stored on the memory of the portable memory device or on the PGD prior to first use of the device. If the reference biometric data is stored on the portable memory device, the data may be verified by the portable memory device processor by comparing the measured biometric data with the reference biometric data, both stored on the memory of the portable memory device. If the measured biometric data does not match the reference biometric data, the predetermined game play outcome is not decrypted or sent to the PGD controller for operation of the wager-based game. It is beneficial for the reference biometric data to be stored on the portable memory device since the player will be able to use the device on any PGD and/or at any stationary free standing gaming machine. On the other hand, if the reference biometric data is stored on the PGD, the player is limited to the use of that specific PGD.

However, it is possible for the reference biometric data to also be stored on the PGD as either a primary or secondary verification check. The reference biometric data ideally would be obtained and stored in the memory before the play of games on the PGD. In a primary verification process, the PGD controller would obtain the measured biometric data from the memory of the portable memory device and compare it to the reference biometric data stored in the PGD memory. Alternatively, the measured biometric data may be obtained from a biometric sensor on the PGD itself. If the measured biometric data does not match the reference biometric data, the PGD would not operate and/or allow the player to play the wager-based game. The PGD may also act as a secondary verification check. In addition to the verification done by the portable memory device, the PGD may also verify that the measured biometric data is matched to the reference biometric data. This would increase the security of the portable memory device and PGD.

At least one predetermined game play outcome for the wager-based game may be stored on a memory of a portable memory device at 602. The memory may be coupled to a portable memory device processor to encrypt the predetermined game play outcome at 604.

The portable memory device may then be inserted into the PGD at 606. Biometric data from the player may be measured at 608. The biometric data may be measured on the portable memory device and/or PGD and stored on the memory of the portable memory device and/or PGD. The measured biometric data may then be compared to the reference biometric data at 610. Those of ordinary skill will now realize that the steps may be performed in various orders. For example, the comparison may occur prior to the device being inserted into the PGD. As stated above, the reference biometric data may either be stored and/or retrieved from the portable memory device or on the PGD. If the measured biometric data does not match the reference biometric data at 612, the predetermined game play outcome is not decrypted or sent to the PGD controller for operation of the wager-based game. Additionally, the PGD would not operate and/or allow the player to play the wager-based game. However, if the reference and measured biometric data match at 612, the predetermined game play outcome is sent to the PGD controller at 614 for display on the PGD.

The portability of the portable memory device allows a player to play the pre-purchased predetermined games on any PGD and not be limited to the use of a single, specified PGD. The interchangeability of the portable memory device on any PGD also gives a player the flexibility to play the wager-based games at any time. For example, should the player have to stop playing a wager-based game on a first PGD in the middle of the game, the game may be saved on the portable memory device for the player to resume game play on a different PGD if the first PGD is lost, has no power, or is for some reason unavailable for use.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A remote gaming system comprising:

a portable memory device having a first memory configured to store at least one predetermined game play outcome for a wager-based game and a first processor coupled to the first memory;

at least one portable gaming device comprising:

an interface for receiving and reading the portable memory device;

a display device; and a controller operatively coupled to the display device and the interface, the controller comprising a second processor having a second memory operatively coupled to the second processor, the controller being programmed to cause the display device to generate a game display relating to the wager-based game, to accept a wager for the wager-based game, and to display the at least one predetermined game play outcome;

a biometric sensor coupled to the portable memory device to measure first biometric data from a user to access the wager-based game, wherein the first processor or the second processor is configured to compare the first measured biometric data with reference biometric data; and a remote gaming server in electronic communication with the at least one portable gaming device, the remote gaming server configured to provide the at least one predetermined game play outcome for the wager-based game to the portable memory device.

2. The system of claim 1, wherein the predetermined game play outcome is encrypted.

3. The system of claim 1, wherein the wager-based game is one of a plurality of wager-based games and the number of wager-based games to be played comprises a block of games to be paid for when purchasing or updating the portable memory device.

4. The system of claim 1, wherein the first memory stores computer program instructions relating to the wager-based game.

5. The system of claim 4, wherein the at least one portable gaming device controller is programmed to read the computer program instructions.

6. The system of claim 1, wherein the at least one portable gaming device controller is programmed to receive the first measured biometric data from the portable memory device.

7. The system of claim 1, wherein the at least one portable gaming device further comprises a second biometric sensor to measure second biometric data from the user.

8. The system of claim 7, wherein the second measured biometric data is stored in the second memory.

9. The system of claim 7, wherein the second processor is configured to compare the second measured biometric data with the reference biometric data.

10. The system of claim 9, wherein the at least one portable gaming device does not operate if the second measured biometric data does not match the reference biometric data.

11. The system of claim 1, wherein the reference biometric data is stored in the first memory before insertion of the portable memory device into the at least one portable gaming device.

12. The system of claim 11, wherein the reference biometric data is encrypted.

13. The system of claim 11, wherein the at least one predetermined game play outcome is not decrypted if the first measured biometric data does not match the reference biometric data.

14. The system of claim 1, wherein the at least one portable gaming device does not operate the wager-based game if the at least one portable gaming device has not been provided with the at least one predetermined game play outcome.

15. The system of claim 1, wherein the reference biometric data is stored in the second memory before the play of the wager-based game on the at least one portable gaming device.

16. The system of claim 15, wherein the reference biometric data is encrypted.

17. The system of claim 15, wherein the at least one portable gaming device does not operate if the first measured biometric data does not match the reference biometric data.

18. The system of claim 1, further comprising a transceiver coupled to the remote portable memory device processor and the at least one portable gaming device to transmit information to the remote gaming server.

19. The system of claim 18, wherein the transceiver is wireless.

20. The system of claim 1, wherein the remote gaming server is a slot machine.

21. The system of claim 1, wherein the biometric sensor includes at least one of a fingerprint imager, a retina print imager, a voice pattern imager, and a facial component imager.

22. A remote gaming system comprising:

a portable memory device having a first memory configured to store at least one predetermined game play outcome for a wager-based game and a first processor coupled to the first memory;

at least one portable gaming device, comprising:

an interface for receiving and reading the portable memory device;

a display device; and a controller operatively coupled to the display device and the input device, the controller comprising a second processor having a second memory operatively coupled to the second processor, the controller being programmed to cause the display device to generate a game display relating to the at least one wager-based game, to accept a wager for the at least one wager-based game, and to display the at least one predetermined game play outcome; and a biometric sensor coupled to the portable memory device to measure first biometric data from a user to access the wager-based game, wherein the first processor or the second processor is configured to compare the first measured biometric data with reference biometric data.

23. The system of claim 22, wherein the predetermined game play outcome is encrypted.

24. The system of claim 22, wherein the wager-based game is one of a plurality of wager-based games and the number of wager-based games to be played comprises a block of games to be paid for when purchasing or updating the portable memory device.

25. The system of claim 22, wherein the at least one portable gaming device controller is programmed to receive the first measured biometric data from the portable memory device.

26. The system of claim 22, wherein the at least one portable gaming device further comprises a second biometric sensor to measure second biometric data from the user.

27. The system of claim 26, wherein the second measured biometric data is stored in the second memory.

28. The system of claim 26, wherein the second processor is adapted to compare the second measured biometric data with the reference biometric data.

29. The system of claim 28, wherein the at least one portable gaming device does not operate if the second measured biometric data does not match the reference biometric data.

30. The system of claim 22, wherein the reference biometric data is stored in the second memory before the play of games on the at least one portable gaming device.

31. The system of claim 30, wherein the reference biometric data is encrypted.

32. The system of claim 30, wherein the at least one portable gaming device does not operate if the first measured biometric data does not match the reference biometric data.

33. The system of claim 22, wherein the reference biometric data is stored in the first memory before insertion of the portable memory device into the at least one portable gaming device.

34. The system of claim 33, wherein the reference biometric data is encrypted.

35. The system of claim 33, wherein the at least one predetermined game play outcome is not decrypted if the first measured biometric data does not match the reference biometric data.

36. The system of claim 22, wherein the at least one portable gaming device does not operate the wager-based game if the at least one portable gaming device has not been provided with the at least one predetermined game play outcome.

37. A method for playing a wager-based game on a portable gaming device, comprising:

storing reference biometric data;

storing at least one predetermined game play outcome for the wager-based game on a first memory of a portable memory device;

inserting the portable memory device into a portable gaming device;

measuring biometric data from a user;

comparing the measured biometric data to the reference biometric data; and sending at least one predetermined game play outcome to the portable gaming device if the reference and measured biometric data are the same.

38. The method of claim 37, further comprising displaying the at least one predetermined game play outcome.

39. The method of claim 37, further comprising obtaining the reference biometric data from a second memory in the portable memory device.

40. The method of claim 37, further comprising obtaining the reference biometric data from the first memory in the portable memory device.

41. The method of claim 37, wherein the measuring further comprises obtaining the measured biometric data from a biometric sensor on the portable memory device.

42. The method of claim 37, wherein the storing at least one predetermined game outcome further comprises encrypting the at least one predetermined game play outcome.

43. The method of claim 37, wherein the storing reference biometric data further comprises encrypting the reference biometric data.

44. The method of claim 37, wherein the comparing further comprises decrypting the reference biometric data.

* * * * *